(12) United States Patent
Freund et al.

(10) Patent No.: US 8,632,413 B2
(45) Date of Patent: Jan. 21, 2014

(54) TORSIONAL VIBRATION DAMPER

(75) Inventors: Wolfgang Freund, Langenbernsdorf (DE); Andreas Kissler, Crimmitschau (DE); Juergen Schulze, Chemnitz (DE)

(73) Assignee: Asturia Automotive Systems AG, Munich (DE)

(*) Notice: Subject to any disclaimer, the term of this patent is extended or adjusted under 35 U.S.C. 154(b) by 0 days.

(21) Appl. No.: 12/995,365

(22) PCT Filed: May 25, 2009

(86) PCT No.: PCT/DE2009/000747
§ 371 (c)(1),
(2), (4) Date: Jan. 12, 2011

(87) PCT Pub. No.: WO2009/143828
PCT Pub. Date: Dec. 3, 2009

(65) Prior Publication Data
US 2011/0130208 A1    Jun. 2, 2011

(30) Foreign Application Priority Data

May 30, 2008    (DE) .................... 20 2008 007 303 U

(51) Int. Cl.
*F16F 15/173*    (2006.01)
*F16F 15/123*    (2006.01)

(52) U.S. Cl.
USPC .................................. 464/24; 464/169; 92/33

(58) Field of Classification Search
USPC ............. 464/24, 106, 137, 138, 140, 169, 26; 700/280; 92/31, 33, 84; 74/50, 55, 69, 74/89
See application file for complete search history.

(56) References Cited

U.S. PATENT DOCUMENTS

| 4,734,080 A | 3/1988 | Kronert |
| 5,129,797 A * | 7/1992 | Kanamaru ................ 464/138 X |
| 5,848,938 A | 12/1998 | Curtis et al. |

(Continued)

FOREIGN PATENT DOCUMENTS

| DE | 27 42 560 A1 | 4/1979 |
| DE | 32 28 673 A1 | 3/1983 |

(Continued)

OTHER PUBLICATIONS

International Serach Report dated Oct. 23, 2009 (Four (4) pages).

*Primary Examiner* — Gregory Binda
*Assistant Examiner* — Josh Skroupa
(74) *Attorney, Agent, or Firm* — Crowell & Moring LLP

(57) ABSTRACT

A torsional vibration damper (1) having a damping element disposed between a first element (4) and a second element (5), in which the first element and the second element can rotate relative to each other, with or without a coupling part (3) that is located in a housing (2) and is axially displaceable along an axis (A) between the first and second elements, in which, if a coupling part is present, a) the coupling part is displaceable along the axis (A) against the spring force of at least one spring element (6, 7) and/or b) the coupling part is displaceable along the axis (A) against a medium which acts on both sides of the coupling part, with the medium located in internal or external partial spaces. Alternatively, in a damping element not having a coupling part, c) resilient elements are integrated in third coupling elements, and the coupling elements are connected to the first and second elements.

15 Claims, 2 Drawing Sheets

(56) References Cited

U.S. PATENT DOCUMENTS

| | | |
|---|---|---|
| 6,041,678 A | 3/2000 | Cooke et al. |
| 6,047,804 A | 4/2000 | Feldhaus et al. |
| 2007/0060400 A1 | 3/2007 | Kobelev |

FOREIGN PATENT DOCUMENTS

| DE | 33 27 434 A1 | | 2/1985 |
|---|---|---|---|
| DE | 3327434 A1 | * | 2/1985 |
| DE | 197 33 334 A1 | | 2/1999 |
| DE | 198 12 303 A1 | | 9/1999 |
| DE | 695 21 982 T2 | | 4/2002 |
| DE | 696 15 982 T2 | | 6/2002 |
| DE | 10245457 B3 | * | 3/2004 |
| DE | 10 2005 037 996 B3 | | 8/2006 |
| EP | 0 131 881 A2 | | 1/1985 |
| GB | 298319 | | 10/1928 |
| GB | 1 534 675 | | 12/1978 |
| GB | 2030268 A | * | 4/1980 |
| GB | 2 103 336 A | | 2/1983 |
| GB | 2 122 725 A | | 1/1984 |

* cited by examiner

TORSIONAL VIBRATION DAMPER

BACKGROUND OF THE INVENTION

The invention relates a torsional vibration damper, which is inserted between a driving system and a driven system and serves to damp the input and output vibrations and balances the torque variations.

There exist a plethora of torsional vibration dampers, wherein a driving element and a driven element are connected by a torsional spring (for example, DE 10 2005 037 996 B3) for torque transmission.

Furthermore, there exist systems, wherein a torsional vibration is damped by means of spring elements, which can be loaded in a radial or circumferential direction (DE 198 12 303 A1, DE 197 33 334 A1).

DE 32 28 673 A1 describes a torsional vibration damper with a laterally displaceable damping element. The torsional vibration damper, which is suited in particular for the clutch disk of a motor vehicle, has two damper parts, which can be rotated relative to one another about a common axis of rotation and which are coupled to one another by way of an axial thrust surface and a coupling part. During relative rotation of the damper parts, the coupling part is displaced against the axial force of springs. The coupling part can be firmly connected axially to one of the damper parts, is axially displaceable, but also coupled in a rotationally rigid manner thereto. The coupling part divides a chamber, which is outwardly sealed and at least partially filled with damping liquid, into two partial chambers, which are connected to one another via a throttling channel.

Twin mass flywheels for transmitting a torque and for compensating for the rotary vibrations are described in DE 696 15 982 T2 and in DE 695 21 982 T2. Two flywheel masses are provided that are coupled together with a plurality of pivotal linkages and springs. In this case the springs are constructed in the form of helical springs, extending in the circumferential direction, or are made of an elastomer material. These flywheels exhibit a complicated construction and a large circumference and enable only a small angle of rotation.

Rotational vibration dampers comprising elastomer damping elements are also known from DE 27 42 560 C2, GB 1 534 675 and GB 298,319.

A disadvantage of the aforementioned solutions is the construction, which is relatively complex from the manufacturing standpoint, and the damping properties, which are still insufficient for some applications.

SUMMARY OF THE INVENTION

The object of the invention is to develop a torsional vibration damper, which exhibits a simple structural design, can be used for a wide range of applications and exhibits excellent damping properties and enables an angle of rotation exceeding ±30° of the two shaft ends.

This engineering object is achieved by the features of the first patent claim. Advantageous embodiments are apparent from the dependent claims.

The torsional vibration damper comprises a damping element, which is arranged between a first element and a second element, wherein the first element and the second element are rotatable relative to one another, and is constructed with or without an axially displaceable coupling part, which is arranged in a housing between the first and the second element, wherein when a coupling part is used, this coupling part is arranged between the first element and the second element, and the first element is connected to the coupling part by way of the first rigid coupling elements, which are mounted in a rotatable manner, and the second element is connected to the coupling part by way of the second rigid coupling elements, which are mounted in a rotatable manner, in such a way that during a relative rotation between the first and the second element a) the coupling part is displaced against the spring force of a spring element, and/or
b) the coupling part is displaced against a medium, which acts on both sides of the coupling part, or that during the construction of the damping element with or without the coupling part c) elastic elements are integrated into the third coupling elements, and the coupling elements are connected to the first and the second element.

Preferably the torsional vibration damper has at least a first spring element between the first element and the coupling part and at least a second spring element between the second element and the coupling part, wherein the spring elements are constructed, for example, in the form of a helical spring.

Furthermore, it is possible that at least one spring element is integrated into the respective coupling element, and that the coupling element is longitudinally variable contrary to its spring force owing to the longitudinal variation of the spring.

When a damping medium is used, the coupling part divides a chamber in the housing into two partial chambers, in which the medium is located, which is, in particular, a liquid, a gas or a liquid/gas mixture.

As an alternative, it is also possible to use a gel or a visco-elastic material as the medium located in the partial chambers.

As a consequence of the piston displacement, either the medium is elastically compressed and/or actuates an external elastic buffer by way of a pipe connection.

It is also possible to connect together the partial chambers, so that the medium can flow out of one partial chamber into the other partial chamber. This process takes place preferably with the use of a suitable valve or by way of a bore, of which the cross section acts in a damping determining manner.

The coupling elements are configured preferably in the form of ball bars, which are mounted in a rotationally articulated manner at both ends on the first and second elements and on the coupling part. In this case the coupling part is mounted in an axially and rotationally moveable manner in the housing.

It is possible for the first element to be a first shaft and the second element to be the housing. Furthermore, the first element can be configured as a first shaft, and the second element can be configured as a second shaft or can be coupled to the shafts, wherein in this case the housing is mounted preferably rigidly on the frame.

The first element can be, for example, a driving element, and the second element can be a driven element or vice versa.

Furthermore, the coupling element can have a circumferential collar, which projects into an annular chamber of the housing. The annular chamber is arranged preferably in a centric and circumferential manner and extends radially outwards in the housing. The annular chamber is filled, for example, with a damping medium, which is displaced by the collar during an axial movement of the piston. The displacement takes place preferably by means of defined throttling resistances, which are formed, for example, by means of one or more passages in the collar.

In addition or as an alternative, during an axial movement of the piston the collar can also act against the reset force of an energy storing element, in particular a spring (mechanical spring or gas compression spring).

The invention provides a simple design solution for a torsional vibration damper, which is flexibly adaptable to a variety of applications and which is capable of achieving excellent damping properties, reducing the high torque peaks, and attaining large angles of rotation, by combining the coupling elements with spring elements and/or mediums.

BRIEF DESCRIPTION OF THE DRAWINGS

The invention is described in detail below with reference to the embodiments and the associated drawings.

DETAILED DESCRIPTION

Figure 1:
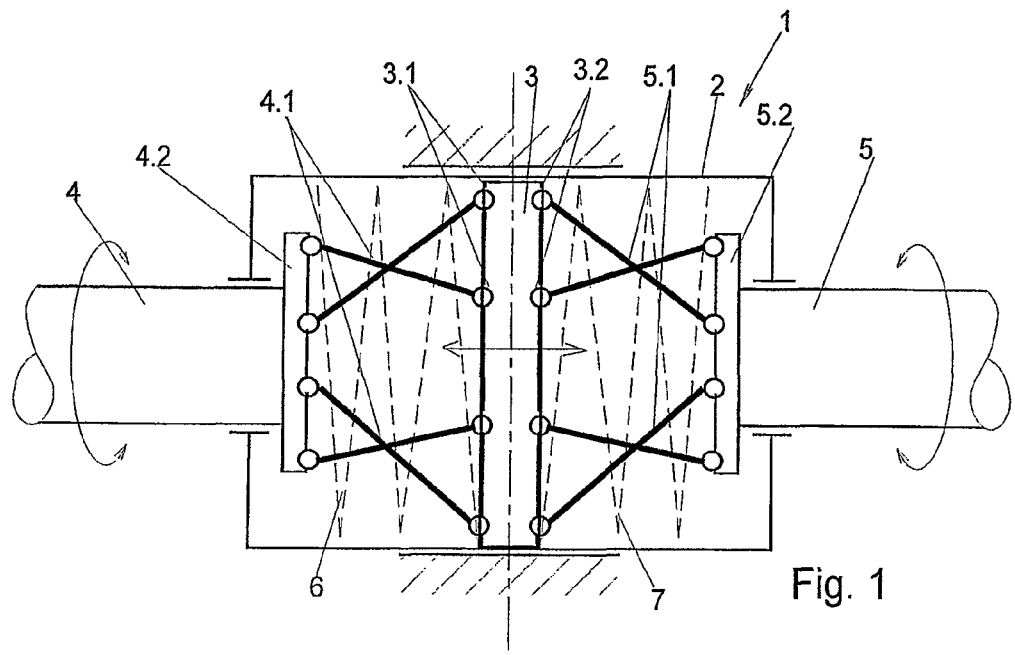
FIG. 1 is a schematic representation of a torsional vibration damper making use of two compression springs, which are arranged on both sides of the coupling part.
Figure 2:
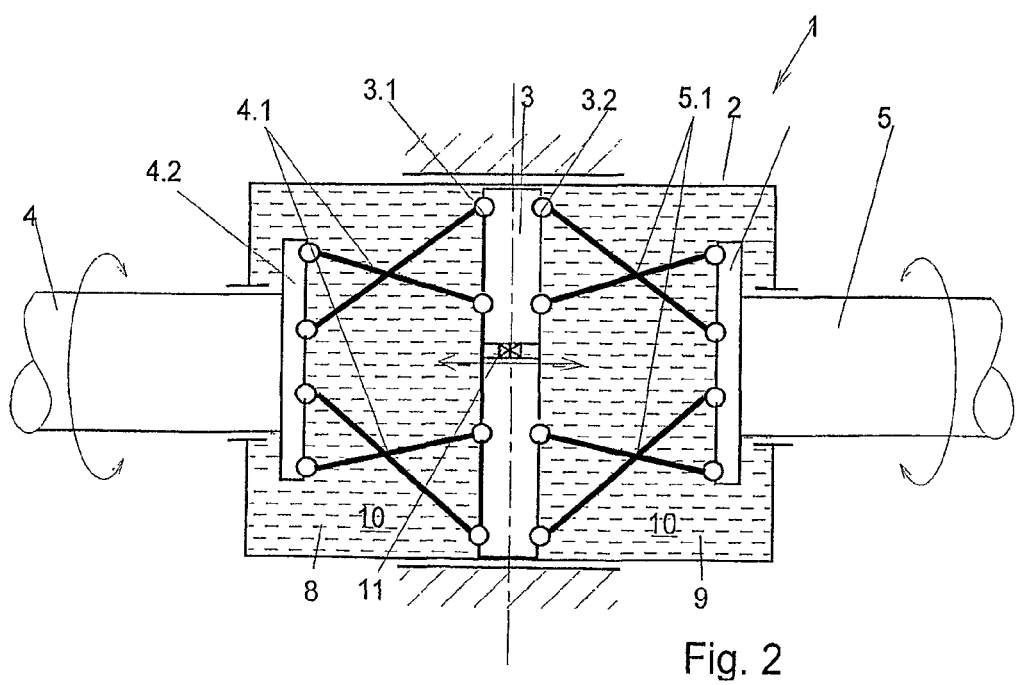
FIG. 2 is a schematic representation of a torsional vibration damper making use of a vibration damping elastic medium.

FIGS. 1 and 2 show a torsional vibration damper comprising a damping element 1, which exhibits an axially displaceable coupling part 3 that is arranged in a housing 2. The housing 2 is mounted rigidly on the frame, and the coupling part 3 is arranged between a first element 4 in the form of a first rotary shaft and a second element 5 in the form of a second rotary shaft. In this case the first element 4 and the second element 5 can be rotated relative to each other. The first element 4 is connected to the coupling part 3 by way of the first rigid coupling elements 4.1, which are mounted in a rotatable manner, and the second element 5 is connected to the coupling part 3 by way of the second rigid coupling elements 5.1, which are mounted in a rotatable manner. The first coupling elements 4.1 are constructed in the form of ball bars and are rotatably mounted, on the one hand, with their ball-shaped ends in a first receptacle 4.2 of the first element 4 and, on the other hand, in a receptacle 3.1 of the coupling part 3. Similarly the second coupling elements 5.1 are also constructed in the form of ball bars and are rotatably mounted with their ball-shaped ends, on the one hand, in a second receptacle 5.2 of the second element 5 and, on the other hand, in a receptacle 3.2 of the coupling part 3.

The first and second coupling elements 4.1 and 5.1 are suitable for transmitting torques between the first and second elements.

In order to damp the torsional vibrations, a first compression spring 6 is arranged, according to FIG. 1, between the first receptacle 4.2 and the coupling part 3, and a second compression spring 7 sits between the second receptacle 5.2 and the coupling part. The first and the second compression springs 6, 7 are constructed in the form of helical springs and are applied under prestress.

According to FIG. 2, the coupling part 3, which is sealed in the direction of the housing 2, splits the chamber in the housing 2 into a first partial chamber 8, which extends from the coupling part 2 in the direction of the first element 4, and into a second partial chamber 9, which extends from the coupling part 3 in the direction of the second element 5. The partial chambers 8, 9 contain a liquid damping medium 10, which is able to flow via at least one valve 11, which is integrated into the coupling part 3, out of one partial chamber 8, 9 into the respective other partial chamber 8, 9. The damping medium that is used is preferably a mixture of gas and liquid.

If the first rotary shaft (first element 1) and the second rotary shaft (second element 2) are rotated relative to one another, then the coupling elements 5.1, 5.2 assume a different spatial angular position, and the coupling part 3 is moved along the longitudinal axis A, as shown in FIG. 1, contrary to the spring force of the compression springs 6, 7 and, according to FIG. 2, contrary to the damping force of the damping medium 10. In this process the coupling part 3 also carries out a rotary movement.

The torsional vibrations between the first element 4 and the second element 5 are damped and torque peaks are diminished by the coupling elements 5.1, 5.2 and the elasticity of the springs 6, 7 (FIG. 1) or the damping medium 10 (FIG. 2). According to an alternative embodiment that is not illustrated, it is also possible to construct in a rotatable manner, for example, the housing as the first or the second element and to fasten to this housing, for example, a shaft stub. Then it is self-evident that the housing is not mounted rigidly on the frame.

Figure 3:
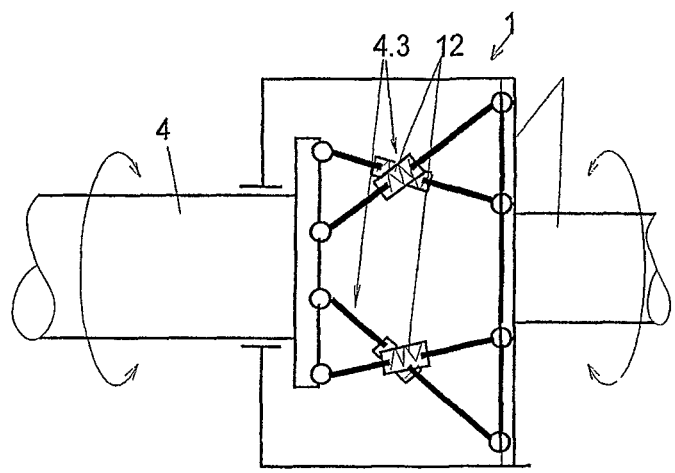
FIG. 3 is a schematic representation of a torsional vibration damper making use of spring elements, which are integrated into the coupling elements, without a coupling part, wherein the housing is connected to the end of the coupling elements.
Figure 4:
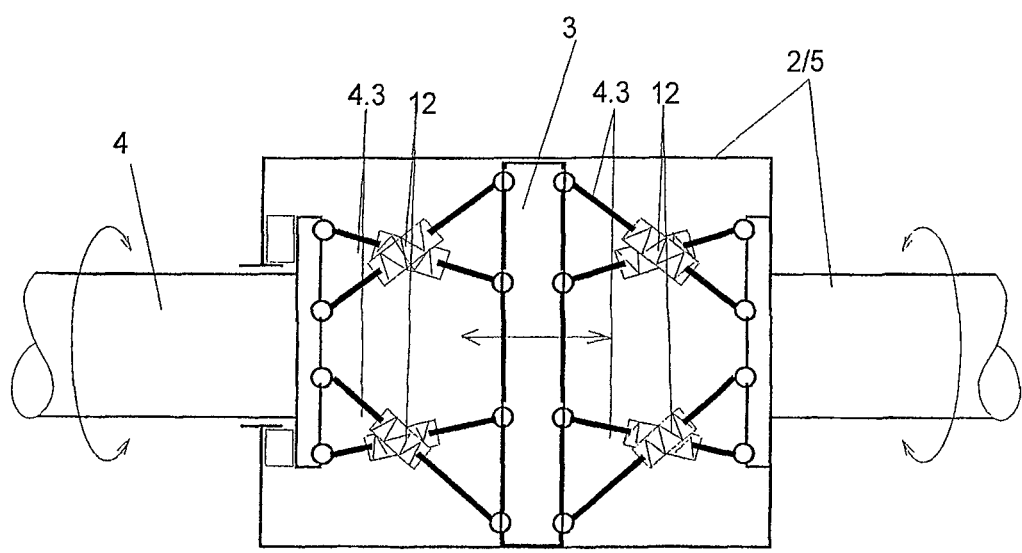
FIG. 4 is a schematic representation of a torsional vibration damper with coupling elements, into which a spring is integrated, and with a coupling part, wherein the housing is connected to the end of the second coupling elements.

FIGS. 3 and 4 show variants of a damping element 1, in which the first element 4 is constructed in the form of a first rotary shaft, and the second element 5, which can be rotated relative thereto, is the housing 2.

According to FIG. 3, the third coupling elements 4.3 are fastened in a pivotable manner to the receptacle 4.2 of the first element 4 and to the receptacle 5.2 of the second element 5. In this case the third coupling elements 4.3 are split in two halves transversely to their longitudinal axis. For this purpose the two halves are connected together by means of a spring 12, which sits in an annular enclosure, which is not specified in greater detail, so that the third coupling elements 4.3 are longitudinally variable against the spring force of the spring 12 during a relative rotation between the first and the second element 4, 5. In this case the coupling part 3 was dispensed with. At the same time the third coupling elements 4.3 should not be bendable, but rather are longitudinally variable only along their longitudinal axis, so that torques can be transmitted with said third coupling elements.

FIG. 4 provides, as in FIGS. 1 and 2, a coupling part 3, which is connected in a pivotable manner by way of the third coupling elements 4.3 to the first element 4 in the form of a rotary shaft and by way of the third coupling elements 4.3 to the second element 5 in the form of the housing 2. As in FIG. 3, the third coupling elements 4.3 have springs 12, by means of which they are longitudinally variable as a consequence of the spring force during a relative rotation between the first and the second element 4, 5. Instead of the third coupling elements according to FIG. 4, the first and second coupling elements 4.1, 5.1 and the helical springs 6, 7 can also be used, as in FIG. 1, or the first and the second coupling elements 4.1, 5.1 and a damping medium 10 can be used, as in FIG. 2.

The invention claimed is:

1. A torsional vibration damper comprising:
   a damper housing,
   a damping element, which is located within the damper housing and is arranged between a first element and a second element, wherein the first element and the second element are rotatable relative to one another, and
   a coupling part, which can be axially displaced along an axis and is arranged in a housing between the first and the second element, wherein:
the coupling part in the housing divides a chamber into two partial chambers,
the first element is connected to the coupling part by way of first rigid coupling elements, which are mounted in a rotatable manner,
the second element is connected to the coupling part by way of second rigid coupling elements, which are mounted in a rotatable manner,
the first and second rigid coupling elements are constructed in the form of ball bars which are mounted in a rotationally articulated manner at both ends such that the first and second rigid coupling elements axially extend and contract between the coupling part and their respective first and second elements in response to relative rotation between the first and second elements generated by at least one of the first and second elements,
the damper housing includes no medium flow passages connecting an interior region of the damper housing with a region outside of the damper housing, and
during a relative rotation between the first and the second element
a) the coupling part is displaced along the axis against the spring force of at least one spring element, wherein at least a first spring element is arranged in a first partial chamber between the first element and the coupling part, and at least a second spring element is arranged in a second partial chamber between the second element and the coupling part,
or
b) the coupling part is displaced along the axis against a medium, which acts on both sides of the coupling part, wherein the medium is located in internal or external partial chambers within the damper housing.

2. A torsional vibration damper as claimed in claim 1, wherein the first, second, and third coupling elements are constructed in the form of ball bars, which are mounted in a rotationally articulated manner at both ends, and wherein the ball bars are divided into two halves that are coupled by means of elastic elements.

3. A torsional vibration damper as claimed in claim 1, wherein the coupling part is mounted in an axially and rotationally moveable manner in the housing.

4. A torsional vibration damper as claimed in claim 1, wherein the spring elements are constructed in the form of a helical spring.

5. A torsional vibration damper as claimed in claim 1, wherein the medium in the partial chambers is selected from the group consisting of liquids, gases, liquid/gas mixtures, gels, and visco-elastic media.

6. A torsional vibration damper as claimed in claim 1, wherein as a result of displacement of the coupling, the medium in the partial chambers is compressed upon application of pressure and/or actuates an external buffer by way of suitable housing connections.

7. A torsional vibration damper as claimed in claim 1, wherein the two partial chambers are connected together by a flow element, which defines a damping constant.

8. A torsional vibration damper, as claimed in claim 7, wherein the two partial chambers are connected together through a valve.

9. A torsional vibration damper as claimed in claim 1, wherein the first element is a first shaft, and the second element is the housing.

10. A torsional vibration damper as claimed in claim 9, wherein the housing is mounted rigidly on a frame.

11. A torsional vibration damper as claimed in claim 1, wherein the first element is a first shaft, and the second element is a second shaft.

12. A torsional vibration damper as claimed in claim 1, wherein the first element is a driving element, and the second element is a driven element.

13. A torsional vibration damper as claimed in claim 1, wherein the first element is coupled to a first shaft or a driving element, and the second element is coupled to a second shaft or a driven element.

14. A torsional vibration damper as claimed in claim 1, wherein the medium in the chambers is actively pressure-controlled, and the torsional vibration damping is effected according to a control algorithm.

15. A torsional vibration damper as claimed in claim 1, wherein the coupling element has a circumferential collar, which in a centrally arranged annular chamber in the axial direction
displaces a damping medium through a defined throttling resistance, and/or
is axially displaced against the spring force of an energy storing element,
and thereby generates a damping force in a direction counter to the movement of the coupling element.

* * * * *